Feb. 3, 1970    F. O. NELSON    3,493,195
PROPULSION UNIT FOR AIRCRAFT AND OTHER VEHICLES
Filed Dec. 22, 1967    2 Sheets-Sheet 1

INVENTOR.
FRANK O. NELSON
BY
Christie, Parker & Hale
ATTORNEYS.

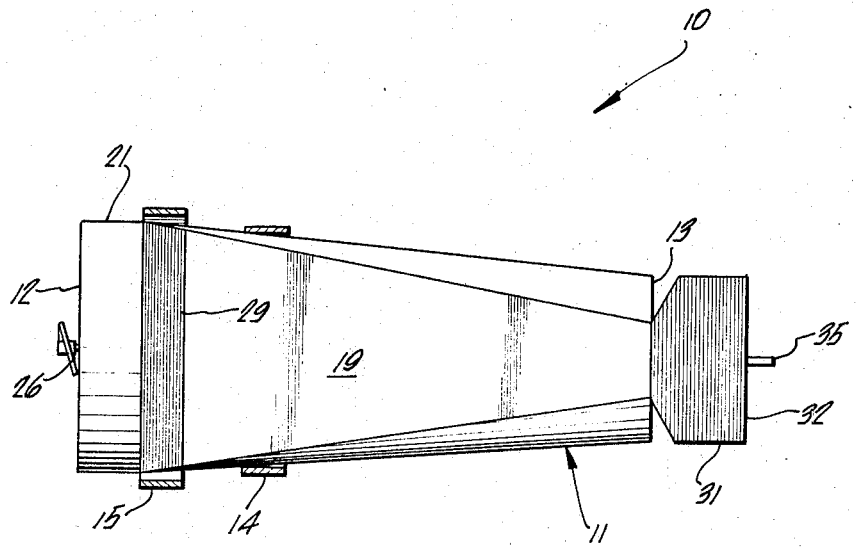
FIG. 3
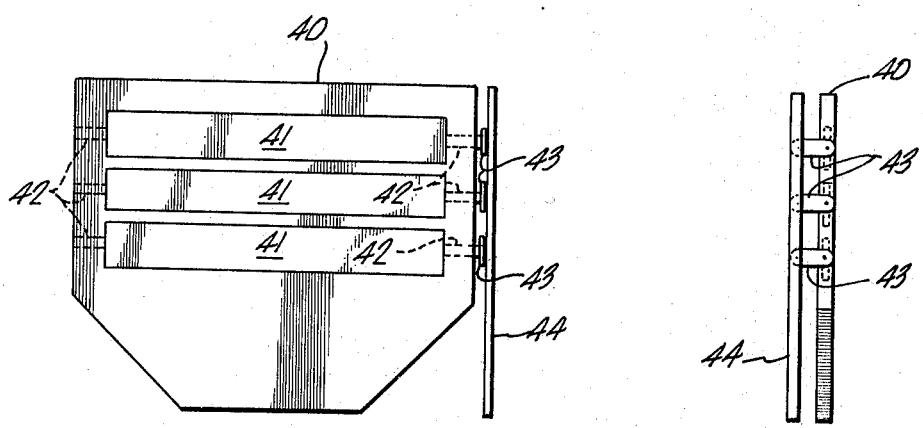
FIG. 4
FIG. 5
INVENTOR.
FRANK O. NELSON
BY Christie, Parker & Hale
ATTORNEYS.

United States Patent Office 3,493,195
Patented Feb. 3, 1970

1

3,493,195
PROPULSION UNIT FOR AIRCRAFT AND
OTHER VEHICLES
Frank O. Nelson, 15410 La Belle St.,
Hacienda Heights, Calif. 91745
Filed Dec. 22, 1967, Ser. No. 692,947
Int. Cl. B64c 3/12, 3/56
U.S. Cl. 244—12                                    9 Claims

ABSTRACT OF THE DISCLOSURE

A propulsion unit for aircraft or other vehicles in which an engine-driven propeller forces air through a rearwardly tapered tunnel having a flat floor. Lifting forces are generated and controlled by a pair of variable-area deflector plates disposed at opposite ends of the tunnel.

Background of the invention

This invention relates to an improved propulsion unit which is especially suitable for aircraft capable of taking off and landing on very short fields. The invention will be described in terms of its use in an aircraft, but it is not limited to this use and is believed to have utility in the propulsion of land, marine and space vehicles.

I have found that controllable propulsion and lifting forces can be generated by propelling air through a tunnel of specific geometry through a body such as an aircraft fuselage. I am aware that others have designed aircraft having tunnel-shaped enclosures behind a propeller, and examples of such designs are shown in U.S. Patents 1,645,612, 2,118,052 and 2,993,662. My design, however, differs markedly from these earlier configurations in that the air tunnel in my design has a flat floor and is continuously tapered toward the rear or aft end.

Generation and control of lifting forces is provided by a pair of deflector plates which are mounted adjacent the front and back ends of the tunnel. Preferably, each deflector plate includes several variable-position louver panels secured to the plate and movable to vary the effective area of the plate for control purposes. Alternatively, the deflector plates may be hinge-mounted to the tunnel-defining body to be variable in position for control purposes.

A wingless model aircraft incorporating the features of the invention has been constructed and test flown. The model exhibited the highly desirable properties of a very short ground roll during takeoff, a high rate of ascent after takeoff, and rapid acceleration in flight. It is believed that these same characteristics would be exhibited by a full-scale aircraft which incorporated the design features included in the model.

Summary of the invention

Briefly stated, the propulsion unit of this invention is intended for operation in a fluid medium such as air, and comprises a hollow elongated body having open front and rear ends, and having inner surfaces defining a tunnel between the ends. The inner surfaces include a flat portion forming a tunnel floor, and a curved, longitudinally tapered portion forming tunnel walls extending upwardly from the floor. The tunnel is of decreasing cross section toward the rear end. A fluid-medium propelling means, such as a propeller and associated drive means, is secured to the body, and is positioned to drive the fluid medium rearwardly through the tunnel.

In a presently preferred form of the invention, the propulsion-unit propeller is spaced forwardly from the tunnel floor whereby the fluid medium is driven by the propeller to flow rearwardly both above and below the tunnel floor. A forward deflector plate is secured to the body adjacent its front end to extend rearwardly and upwardly toward the undersurface of the tunnel floor. Fluid medium flowing under the floor is deflected upwardly by the forward deflector plate and flows rearwardly through an open space between the upper end of the plate and the undersurface of the floor.

Preferably, the flat floor tapers rearwardly to be narrower at the rear end than at the front end, and a rear deflector plate is secured to and extends upwardly and rearwardly from the rear end of the body in the path of air flowing out of the tunnel. The top of the tunnel is formed to be parallel to the flat floor of the tunnel, and each deflector plate preferably includes control means such as louver panels for varying the effectiveness of the plate in deflecting the fluid medium.

Brief description of the drawings

The invention will be described in detail with reference to the attached drawings, in which:

FIG. 3 is a bottom view of the aircraft taken on line 3—3 of FIG. 1;

FIG. 4 is an elevation of a modified rear deflector plate for the aircraft; and

FIG. 5 is a side view of the deflector plate shown in FIG. 4.

Description of the preferred embodiment

Figure 1:
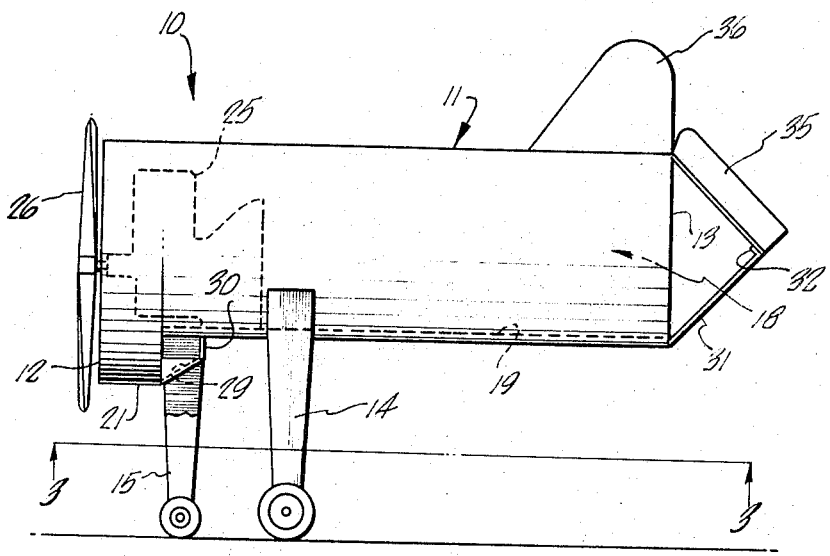
FIG. 1 is a side view of a model aircraft constructed according to the invention.
Figure 2:
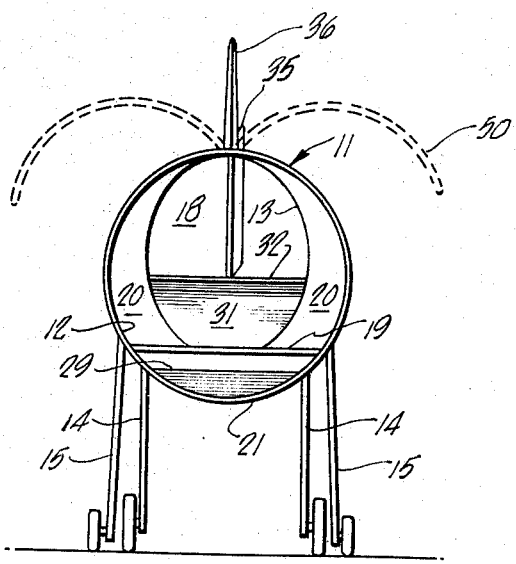
FIG. 2 is a front view of the aircraft, with the engine and propeller deleted for clarity.

FIGS. 1-3 show an aircraft 10 which embodies the principles of the invention and has been test flown. The aircraft has a fuselage 11 formed as a hollow elongated body having open front and rear ends 12 and 13. A main landing gear 14 is secured to the fuselage just aft of the center of gravity of the aircraft, and a forward landing gear 15 is secured to the front end of the fuselage. The landing gear is designed to position the fuselage well above the ground such that a steep pitch attitude may be achieved during takeoff without dragging the rear of the fuselage on the ground.

The hollow elongated body which forms fuselage 11 has inner surfaces which define a tunnel 18 between front and rear ends 12 and 13. The inner surfaces include a planar or flat portion 19 which forms a floor of the tunnel, the floor having a rearwardly tapered plan form as best seen in FIG. 3. The inner surfaces also include a curved, longitudinally tapered portion 20 extending upwardly from the floor to form side walls and a roof of the tunnel. The forward end of the fuselage defines a cylindrical ring portion 21 which is slightly larger than the rest of the tunnel such that the ring portion extends ahead of and downwardly below the forward end of the flat floor.

As shown in FIGS. 1-3, the geometry of the tunnel is such that the front of the tunnel (defined by ring portion 21) is circular in cross section. The tapered floor of the tunnel begins immediately aft of this circular portion, and the tunnel thereafter steadily decreases in cross-sectional area toward the rear end. The top of the tunnel does not slope (see FIG. 2), and is parallel to the flat floor. The sides of the tunnel, however, converge toward each other as best seen in FIGS. 2 and 3. This produces a nozzle effect as air is propelled through the tunnel, resulting in improved aerodynamic propulsion and lift characteristics. The fuselage is preferably formed to define a tunnel length which is about twice the inside diameter of circular ring portion 21. This geometry has been found to produce maximum performance in the aircraft.

A drive means such as a gasoline engine 25 is secured to the fuselage, and may be positioned in the tunnel as shown in FIG. 1, or may be mounted elsewhere on the aircraft. A propelling means, such as a conventional aircraft propeller 26, is secured to the engine and positioned just ahead of the front of the fuselage and tunnel. Satisfactory performance can also be achieved by positioning the propeller within circular ring portion 21 of the fuselage, but the propeller should be located ahead of the flat floor of the tunnel such that it drives air rearwardly both above and below the flat floor of the tunnel.

A front deflector plate 29 is secured to the underside of cylindrical ring portion 21, and is secured in place by braces 30. The front deflector plate has a flat surface facing the air stream moved rearwardly under flat portion 19 by the propeller, and the plate extends upwardly and rearwardly toward the undersurface of the flat floor of the tunnel.

A rear deflector plate 31 is secured to the fuselage at the aft end of the flat floor of the tunnel. Plate 31 is flat, and extends upwardly and rearwardly away from the aft end of the tunnel floor at an angle of about 45 degrees to the plane of the tunnel floor. A forwardly turned lip 32 is formed at the aft end of the rear deflector plate. As shown in FIGS. 1 and 2, the rear deflector plate preferably rises to approximately the center line of the fuselage tunnel such that about half the air passing through the tunnel impinges on the plate.

A rudder 35 is secured to lip 32 on the rear deflector plate, and extends upwardly and forwardly to be anchored to the top of the rear end of the fuselage. The rudder provides steering action for the aircraft, and is pivoted by conventional means (not shown) to be adjustable in position. A vertical stabilizer fin 36 is secured to and extends upwardly from the top of the aft end of the fuselage.

FIGS. 4 and 5 show a preferred form of a rear deflector plate 40 having variable-position louver panels 41 mounted therein. A pair of pins 42 extend from opposite ends of each louver panel to pivotally secure the panels to the plate. A crank link 43 is secured to each of the pins on one side of the deflector plate, and a control rod 44 is pivotally secured to the free end of each of the crank links.

Movement of control rod 44 causes the louver panels to rotate in the deflector plate to vary the lifting force provided by the plate. That is, the lifting force can be minimized by opening the louver panels fully such that part of the air moved by the propeller passes freely through the deflector plate. Closure of the panels, on the other hand, maximizes the effective surface area of the deflector plate and provides maximum lifting force. Control rod 44 is coupled by conventional means (not shown) to be controllable by the aircraft operator.

The front deflector plate is also preferably equipped with louver panels which may be identical to those shown in FIGS. 4 and 5. Sliding panels may also of course be substituted for the rotating panels as a control means, and an appropriate control linkage used to actuate the panels. Alternatively, the deflector plates can be hingedly mounted to be positionable at variable angles for control purposes.

In operation, the engine is started, and the aircraft is permitted to accelerate until flight speeds are achieved. I have found that a model aircraft embodying the features of the invention will leave the ground in a takeoff distance of about two times the length of the fuselage. The aircraft at full throttle climbs at a step angle after takeoff, and is thereafter controlled by manipulation of the rudder and louver panels in the deflector plates and by varying the engine speed.

The aircraft is capable of flight without additional aerodynamic lifting surfaces, but more efficient (fuel-saving) cruising flight is achieved by providing wings 50 (shown in phantom lines in FIG. 2) which are shaped to conform to the sides of the fuselage and which can be raised by conventional means (not shown) after the aircraft is in horizontal flight. The landing gear can be made retractable to reduce drag during flight.

While the invention has been tested only in model form, the test results indicate that full-scale aircraft built according to the invention will exhibit the short-field takeoff characteristics, the high rate of climb, and the rapid acceleration which characterizes the performance of the model. The invention has been described in terms of an aircraft which has a tunnel through the aircraft fuselage, but it will be clear that several tunnels could also be spaced apart on opposite sides of the fuselage of a multi-engined aircraft. In this form, the tunnels would appear essentially as nacelles secured to the fuselage, or mounted on an aircraft wing. The invention is thus viewed as a basic propulsion system, and is believed to have application in land and marine craft as well as in aircraft.

I claim:

1. A propulsion unit for operation in a fluid medium, comprising:
a hollow elongated body having open front and rear ends and having inner surfaces defining a tunnel between the ends, the inner surfaces including a flat portion forming a tunnel floor and a curved, longitudinally tapered portion forming tunnel walls extending upwardly from the floor, the tunnel being of decreasing cross section toward the rear end, the front end of the body defining a substantially circular hollow ring portion extending forwardly from and extending beneath a forward end of the flat portion, and a fluid-medium propelling means secured to the body and positioned ahead of the flat portion to drive the fluid-medium rearwardly through the tunnel and rearwardly to a forward outlet at a rear end of the hollow ring beneath the flat portion, the cross-sectional area of the tunnel being substantially larger than the cross-sectional area of the forward outlet whereby a majority of the fluid medium acted upon by the propelling means flows through the tunnel.

2. The propulsion unit defined in claim 1 in which the fluid-medium propelling means comprises a propeller and a propeller drive means secured to the body and the propeller, the propeller being spaced forwardly from the tunnel floor whereby the fluid medium driven by the propeller flows rearwardly both above and below the tunnel floor, and further comprising a front deflector plate secured to the body at the forward outlet and extending rearwardly and upwardly toward the undersurface of the tunnel floor.

3. The propulsion unit defined in claim 2 in which the flat floor tapers rearwardly to be narrower at the rear end than at the front end; in which the tunnel has a length about twice as long as an inner diameter of the hollow ring portion of the body; and further comprising a rear deflector plate secured to and extending upwardly and rearwardly from the rear end of the body in the path of air flowing out of the tunnel.

4. The propulsion unit defined in claim 3 in which the top of the tunnel is substantially parallel to the flat floor.

5. The propulsion unit defined in claim 3 in which each deflector plate includes control means for varying the effectiveness of the plate in deflecting the fluid medium.

6. The propulsion unit defined in claim 5 in which at least one of the control means includes a variable-position louver panel secured to the associated plate and movable to vary the effective area of the plate.

7. The propulsion unit defined in claim 3 in which the body is a fuselage of an aircraft.

8. The propulsion unit defined in claim 7 in which the top of the tunnel is substantially parallel to the flat floor, and in which each deflector plate includes control means for varying the effectiveness of the plate in deflecting the fluid medium, the tunnel having a length about twice as large as an inner diameter of the hollow ring portion of the body.

9. The propulsion unit defined in claim 8 and further comprising a retractable wing secured to the fuselage.

References Cited

UNITED STATES PATENTS

| | | | |
|---|---|---|---|
| 915,972 | 3/1909 | Lake | 244—73 |
| 2,272,661 | 2/1942 | Finley | 244—73 X |
| 2,918,230 | 12/1959 | Lippisch | 244—23 |
| 3,148,848 | 9/1964 | Price | 244—23 |
| 3,241,771 | 3/1966 | Erwin | 244—23 X |
| 3,362,659 | 1/1968 | Razak | 244—54 X |

OTHER REFERENCES

Aviation Week; Apr. 14, 1958.

MILTON BUCHLER, Primary Examiner

J. C. FORMAN, Assistant Examiner

U.S. Cl. X.R.

244—34